Figure 1:
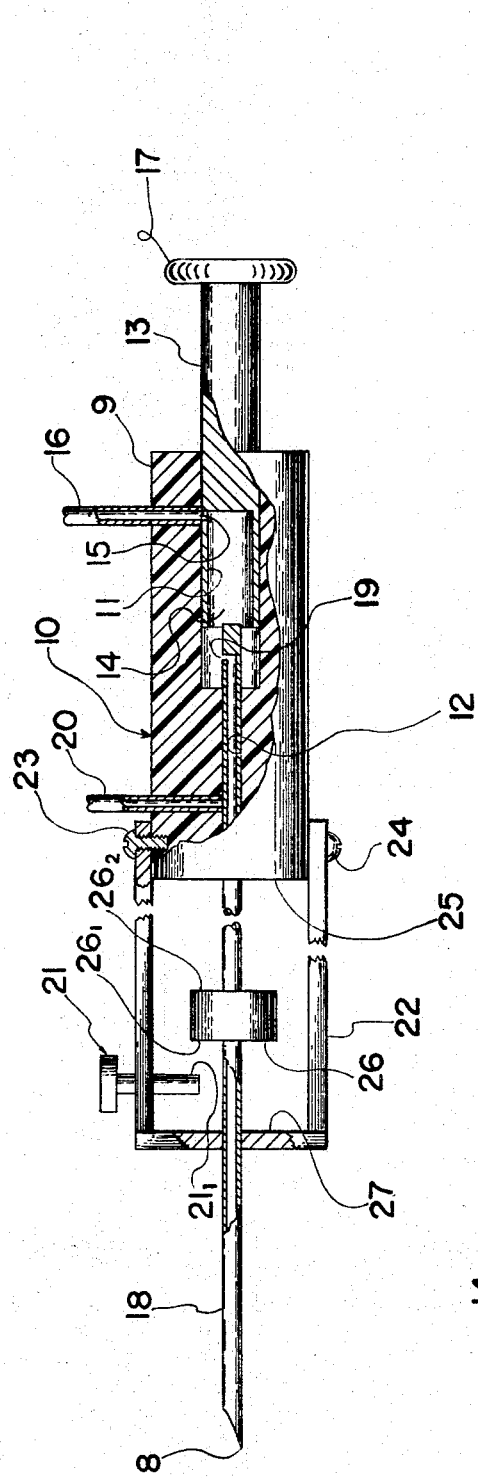

Oct. 18, 1966  R. J. HARRIS, JR  3,279,659
INJECTION APPARATUS

Filed March 2, 1965  3 Sheets-Sheet 1

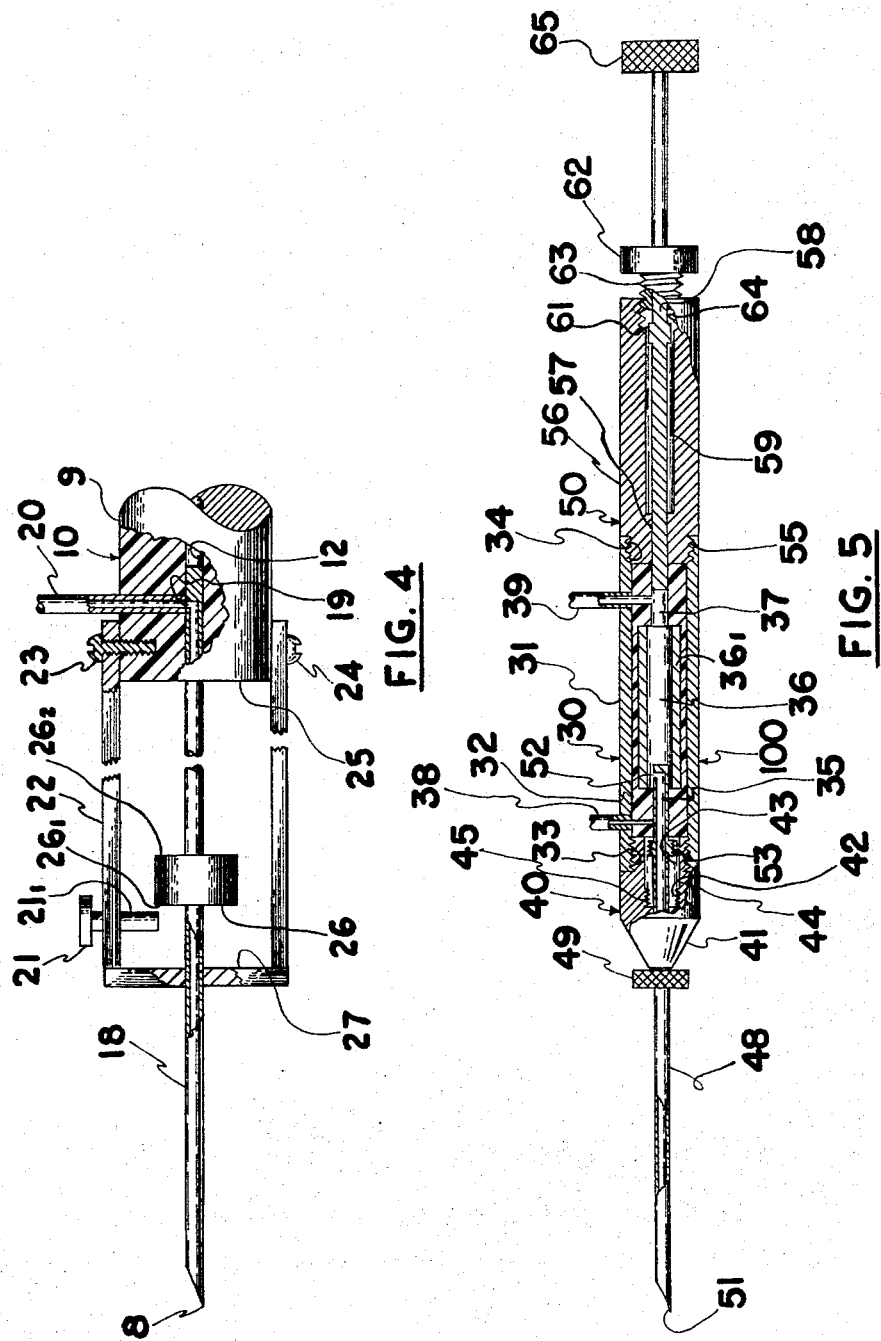

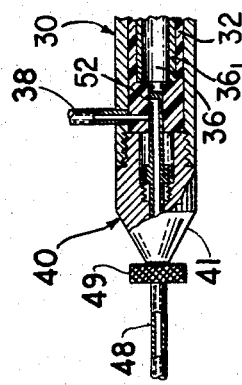
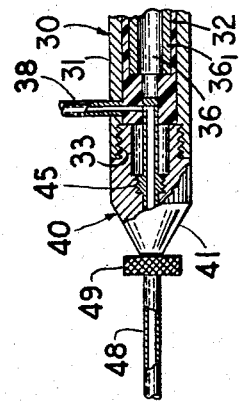
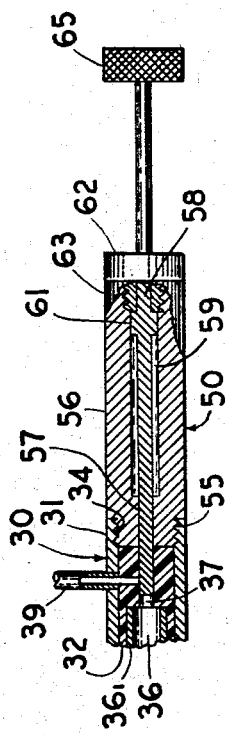
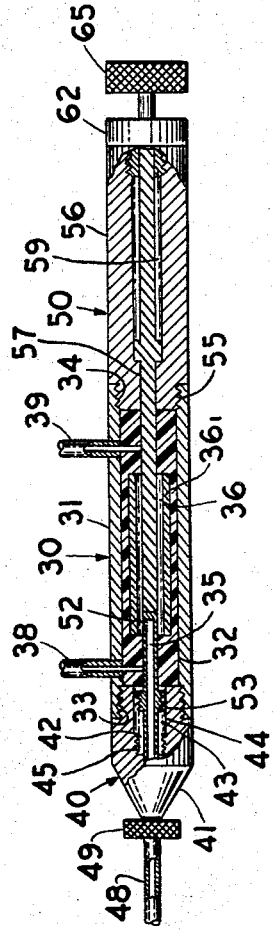

United States Patent Office 3,279,659
Patented Oct. 18, 1966

3,279,659
INJECTION APPARATUS
Rano Joseph Harris, Jr., Baton Rouge, La., assignor to Precision Sampling Corporation, Baton Rouge, La., a corporation of Louisiana
Filed Mar. 2, 1965, Ser. No. 436,612
8 Claims. (Cl. 222—387)

This invention relates to the art of dispensing fluids and, in particular, to apparatus and apparatus combinations for injection of small, accurately measured quantities of fluids, especially liquids. More particularly, the invention relates to micro and semi-micro injection apparatuses.

In many applications there is need for the delivery of relatively small, accurately measured quantities of fluid into a system. One such important application involves the delivery of micro quantities of fluids, especially liquids, into an analytical device, e.g., a chromatograph. The measurement and delivery of the fluid into the chromatograph generally calls for the use of elaborate, sophisticated and expensive auxiliary equipment. The use of such auxiliary equipment can oftimes be inefficient and troublesome, particularly where there is a need for analyzing a relatively wide variety of materials and changeovers are frequent.

It is accordingly an object of this invention to provide new and novel apparatus combinations readily adaptable for precision injection and delivery of fluids. In particular, it is an object to provide simple novel injection apparatus which can be provided with an accurately measured quantity or fixed volume of fluid for delivery, e.g., to a chromatograph. More particularly, it is an object to provide apparatus especially suitable for high pressure injections. A further object is to provide such apparatus which can be readily and easily cleaned.

These and other objects are attained in accordance with the present invention which contemplates, in general, an improved fluid injection apparatus combination, the features of which include a chamber defined by a housing having enclosing walls, an outlet vent located within the housing and opening into the chamber, a reciprocable plunger located within the housing for opening and closing said outlet vent, a hollow or tubular needle mounted within said housing and communicating with the chamber, and valve means for opening and closing the passageway through the needle.

The needle is preferably valved by slidably mounting the needle within the chamber wall and by permanent closure of the terminal end while side venting same for open communication with the dispensing end of the needle. By projection of the side vented portion of the needle into the chamber, the latter is brought into communication with the exterior and fluid can pass through the needle to the chamber and vice versa. Conversely, retraction of the vented portion of the needle into the chamber wall will cause the wall to close off communication between the chamber and the needle.

The outlet vent to the chamber is opened and closed by a slidable plunger which covers and uncovers the vent to permit or stop the passage of fluid therethrough. In one embodiment the plunger is provided with a forward recessed opening communicating with the chamber. A wall of the recessed portion of the plunger is also vented, and alignment of this vented portion with the outlet vent in the chamber wall permits flow of fluid from the chamber to the exterior. In another embodiment, the outlet vent is opened and closed by a solid reciprocable plunger.

By the use of the apparatus a specific volume of fluid can be provided to and trapped or contained within the confines of the chamber. The accurately measured volume of fluid can then be injected into a system.

The invention will be better understood by reference to the following detailed description of preferred embodiments and to the enclosed drawings.

Figure 3:
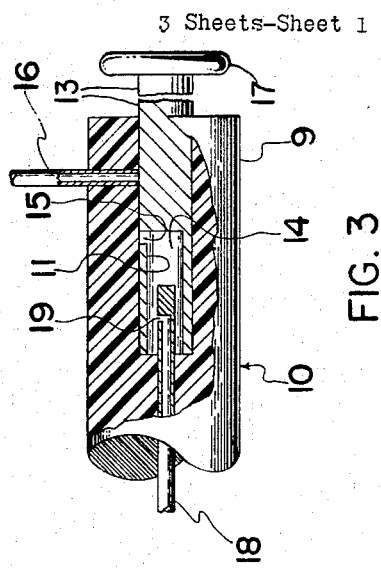
Figure 2:
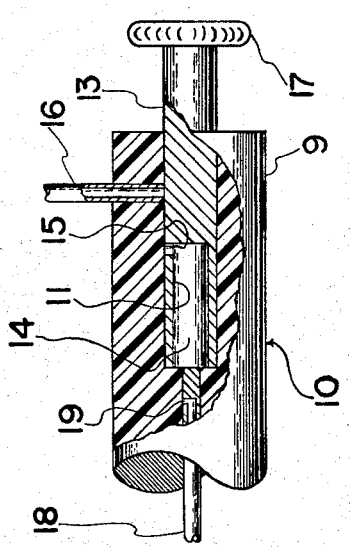

In the drawings:

FIGURE 1 is a half-section view of an injection apparatus which provides features for trapping and containing a fixed volume of fluid with a chamber for injection via a needle, and also provides features facilitating the cleaning of the device, FIGURES 2–4 are fragmentary half-section views of FIGURE 1 showing the several operating positions of various portions of the apparatus in cleaning, receiving, trapping and injecting a fixed volume of fluid.

FIGURE 5 is a half-section view of a particularly preferred form of apparatus and provides, inter alia, features making possible the positive ejection of a trapped fluid specimen where desired, and FIGURES 6–9 are fragmentary half-section views of the apparatus of FIGURE 5 showing the several operating positions for cleaning, receiving, containing and injecting an accurately measured volume of fluid.

Referring to FIGURE 1 is shown an injection apparatus 10 consisting of a tubular main body section or barrel 9 provided with lateral vent openings, i.e., vents 16, 20, which can communicate with the internal passageway through barrel 9. The internal passageway, i.e. the internal opening of the barrel 9, consists of axially aligned contiguous openings, a larger opening 11 and smaller opening 12. Within internal passageway 11 is contained a partially hollow slidable plunger 13. Within internal passageway 12 is contained a slidable hollow, or tubular, needle 18. Fitted upon the forward end of barrel 9 is barrel extension member 22 provided with a stop 21 for limiting the forward movement of needle 18.

Inside opening 11 is slidably fitted a mating plunger 13, having a handle 17 at one extremity. The opposite extremity of plunger 13 is provided with a forward recess or open-end chamber 14. The opening 11 and the recessed portion of plunger 13 constitute in effect a singular chamber. The wall of chamber 14 is provided with a lateral vent 15 which can be aligned with vent 16 of barrel 9 by retraction or outward movement of plunger 13. Such alignment is shown in FIGURE 1.

Slidably fitted into the forward opening 12 of barrel 10 is a hollow or tubular needle 18 having a dispensing end 8. The needle 18 per se is also provided at its opposite or terminal end with a vent 19 which can be moved into the opening 11 for communication with vent 16 via the open-end chamber 14 and lateral vent opening 15 of chamber 14. Vent 19 of needle 18 can also be aligned, when desired, with lateral vent 20 by retraction of needle 18 within opening 12. Thus, in certain instances, as will be later explained, it is desirable to pass fluids through needle 18, through chamber 14 and vents 15, 16. At other times, as for cleaning, it may be desired to pass, or even circulate, a purging fluid from needle 18 through vent 20. Thus, it may be desirable to vent both the dispensing end 8 and the terminal end of needle 18 to the exterior.

In the normal operation of the injection device 10 it is desired to trap an accurately measured quantity of fluid within chamber 14 for later injection via needle 18 into a system. This contemplates completely filling calibrated chamber 14 with the fluid to be injected, this constituting a specific volume of the fluid at known temperature. To initiate flow of fluid to chamber 14 all that may be desirable is to place the dispensing end 8 of needle 18 in a source of fluid, withdraw plunger 13 to align vents 15, 16, and then retract needle 18 until the vent 18 of the needle is open to chamber 14. This positioning, shown by specific reference to FIGURE 1, can be maintained as long as desirable to permit the fluid to sweep away air and other forms of contamination.

To trap the fluid specimen within chamber 14, where the liquid is thus flowing through the chamber 14 and out through vents 15, 16, all that is necessary is to push inwardly on handle 17 to move plunger 13 and bring vents 15, 16 out of alignment. This stops the flow of fluid. The fluid speciment is then trapped by moving needle 18 forward to bring vent 19 of the needle out of chamber 14. The vent 19 is thus closed and the sample completely contained because vent 19 is blocked by the wall of passageway 12. This condition is shown by specific reference to FIGURE 2.

It is, of course, not necessary to use a flow through method for filling the instrument. Thus, there is no necessity to align vents 15, 16. One may completely remove plunger 13, fill chamber 14 with an accurately measured quantity of liquid and then replace plunger 14. In fact, to assure great accuracy one may cool down the instrument in liquid nitrogen, carbon dioxide, Varsol or the like and then charge chamber 14 with cold liquid to ascertain that the specimen remains in liquid state. The plunger 13 is then replaced and the instrument is ready for injection of the fluid specimen.

To inject the measured volume of fluid (FIGURE 3) into a system all that is necessary, where the flow through method is used, is to withdraw the device 10 from the supply source, dry out the opening or bore of needle 18, push the dispensing end 8 of needle 18 into a system and then slide needle 18 (or barrel 9 relative to needle 18) until vent 19 again moves back and opens into chamber 14. When vent 19 is so opened to chamber 14 the measured volume of fluid will exit from the device via needle 18. Where the liquid does not exert enough pressure to force itself out, needle 18 can be further moved to the rear of chamber 14 to positively displace the fluid out of chamber 14 and into the system, thereby positively ejecting it.

In referring to the operation by specific reference to FIGURES 1–3, it will also be noted that the movement of needle 18 within barrel 9 is desirably between two extremes, i.e., a forward position which closes vent 19 and a second position which opens vent 19 to chamber 14. This limited forward movement can be provided by virtue of stop 26 which is rigidly affixed on needle 18. In limiting the forward movement of needle 18 stop 26 will abut against the projected portion 21, of stop button 21 of barrell extension member 22, the latter of which is rigidly affixed to barrel 9 via bolts 23, 24. Movement in the reverse direction is limited by impingement of stop 26 against end wall or face 25 or barrel 9, or by impingement of the rearward end of needle 18 against the rearward end of chamber 14, or both.

There is another optional embodiment by virtue of which the needle 18 can be thoroughly purged and cleaned. This mode of practicing the invention is described by reference to FIGURE 4 wherein the operation and use of vent 20 is now discussed.

To clean and purge needle 18, stop 21 can be altogether removed from the barrel extension 22 or removed to a more extreme forward position so that the needle 18 can also be drawn to a more forward position. Thus, as shown in FIGURE 4, stop 21 is positioned to permit the needle 18 to be drawn forward until vent 19 is aligned with vent 20. In this position face $26_1$ of stop 26 again abuts projecting surface $21_1$ of stop 21. Obviously also, the stop 26 could be positioned so that face $26_1$ abutted forward wall 27 of barrel extension 22 to accomplish the same end. The dispensing end 8 of needle 18, in any event, can be placed in a source of fluid, e.g., liquid, and the purging liquid drawn through needle 18 and out through vent 20. Several purges can be used, if desired. A purging liquid can even be cycled. The needle 18 is very easily cleaned and dried. After cleaning and drying, the needle 18 is again moved back into barrel 9. The apparatus 10 is then ready for recharging with fluid. Thus, the cycle of operation, particularly that described by reference to FIGURES 1 through 3, can be repeated ad infinitum.

A specifically preferred apparatus is described by reference to FIGURES 5–9. This is a form of high pressure apparatus and provides, inter alia, particularly effective positive means for final and positive ejection of fluid from the device, if desired.

Referring to FIGURE 5 is shown an apparatus 100 having a main tubular body or barrel 30 capped at one end by a needle assembly 40 and at the other by a plunger-plunger adjustment assembly 50. Preferably, these members are threadedly secured to barrel 30.

The main tubular body or barrel 30 is composed of an outer tubular shell 31 within which is contained an inner concentrically aligned tubular body or member 32. The tubular member 32 terminates just short of each end of the outer shell 31 to leave projecting surfaces. These surfaces provide the internally threaded portions 33, 34 located on tubular shell 31. By means of these threaded portions 33, 34 needle assembly 40 and plunger-plunger adjustment assembly 50 are threadably secured to barrel 10. The inner tubular member 32 is provided with openings 35, 36, 37. Openings 35, 36 permit projection of terminal portions of needle 48 and plunger 58, respectively, into or through larger opening 36. Within the larger opening 36 is contained a tubular member $36_1$ and therein is provided a central chamber for containing an accurately measured or fixed volume of fluid for injection into a system via needle 48. The openings 35, 37 are vented via lateral vents 38, 39.

The needle assembly 40 consists of a hub 41 having an externally threaded projection or shank 42. The external threads of projecting shank 42 mate with internal threads 33 of the tubular body 30 to hold the member rigidly in place. Through the center or axis of hub 41 is provided a chamber 44 which consists of an opening 43 which is contigious and axial to a smaller opening 42. The forward or smaller opening 42 is provded with internal threads 45. The tubular needle 48 is mounted and slidably movable within the hub 41. Needle 48 is provided with a dispensing end 51, and near the terminal end of needle 48 is provided a lateral or side vent 52. When vent 52 is projected into the chamber 36 by movement of needle 48, as shown in FIGURE 5, fluid can flow through the needle 48 and into chamber 36. When, however, the vent 52 is covered by partial retraction into opening 35 of tubular member 32 there is no flow. The needle 48, provided with a rigidly affixed knurled stop 49 which limits or prevents the withdrawal of vent 52 of needle 48 into chamber 36, can also be moved in the opposite or forward direction except as limited by action of stop 53 with the forward end of chamber 44. Contact of stop 53 with the forward end of chamber 44 defines one terminal point of movement and threaded engagement of stop 53 with threads 45 at the forward end of chamber 44 defines the location of maximum extension.

The plunger-plunger adjustment assembly 50 is threadably engaged and rigidly affixed to tubular barrel 30 via threadable connection between threads 34 of tubular shell 31 and the threaded shank 55 of tubular housing member 56. Within housing member 56 is contained contiguous openings 57, 59, the latter being preferably of larger diameter than the former. The plunger 58 is slidably mounted within these openings 57, 59. The forward movement of the plunger 58 is limited by abutment of plunger stop 61 against the forward end wall of larger opening 59, and movement in the opposite direction is limited by impingement of stop 61 against the forward projecting end of vent adjustment screw 62 which is threadably connected to housing member 56 via threaded shank 63 which mates with the internal threads 64 at the terminal end of opening 59. The rigidly affixed knurled plunger handle 65 is provided for convenience.

The operation of the apparatus is best described by reference to FIGURES 5-9. In FIGURE 5 the needle 48 is placed in its fully retracted position so that vent 52 is open to chamber 36. Plunger 58 is also fully retracted, and adjustment screw 62 is partially unscrewed so that vent 39 is just open to chamber 36. In this condition fluid from a supply source can pass from dispensing end 51 through needle 48 into the chamber 36 and out of the chamber through vent 39. For greater accuracy chamber 36 can be cooled to assure complete liquification of a liquid specimen and, under such circumstances, the chamber 36 can be filled without the actual necessity of maintaining the vent 39 in open position.

It is, in any regard, to be noted that vent 39 can be closed very slowly or gradually to provide a very fine adjustment of the volume of the fluid contents. Thus, the adjustment screw 62 can now be screwed or tightened down to move solid plunger 58 forward via contact of the forward end of shank 63 with stop 61 until the flow of fluid stops. This change in positioning is shown by comparison of FIGURES 5 and 6, the final adjustment being shown by reference to FIGURE 6.

The tubular needle 48 is then drawn forward until threaded stop 53 contacts the internally threaded portion 45 at the forward end of opening 44 within hub 41. By such positioning of the needle 48, as shown by reference to FIGURE 7, the fluid specimen is trapped in chamber 36. The dispensing end 51 of needle 48 can then be withdrawn from the supply source.

To inject the fluid all that is necessary is to insert the dispensing end 51 of needle 48 into a system and again retract needle 48 to open vent 52 to chamber 36. Should positive ejection of the fluid from chamber 36 be desirable, the plunger 58 can be brought all the way forward to forcibly expel the fluid. Such condtiion of the instrument is as shown by reference to FIGURE 8.

Should a thorough cleaning of the needle 48 be desired, the needle 48 should again be brought to its forward position wherein the threaded stop member 53 contacts the threaded portion 45. Rotation of the needle 48 as via turning needle handle 49 will cause further forward movement of the needle 48 by slidable engagement of the threads of stop member 53 with threads 45. In accordance therewith, needle 48 moves to its maximum forward position and vent 52 opens into alignment with vent 38 whereupon purging liquids or fluids can be introduced through the needle 48. This positioning of the device is shown by reference to FIGURE 9. After the purging and cleaning the needle 48 can be withdrawn and vent 38 again closed by unscrewing to disengage the threads.

It will be apparent that the apparatus of the present invention is susceptible of numerous different embodiments without departing the spirit and scope thereof. The apparatus is not limited to any particular configuration and the appended claims should be liberally construed.

Having described the invention, what is claimed is:

1. In an apparatus for injection of small, accurately measured quantities of fluid into a system the combination comprising a chamber defined by the enclosing side wall of a tubular member provided with a spaced apart pair of vent openings, a forward outlet vent and a chamber outlet vent, an enclosing end wall within and through which is slidably mounted a tubular needle provided with a single side vent, projection of which side vent portion of the needle (1) into the chamber communicates the chamber via the needle to the exterior, (2) retraction of which side vent portion so that it is covered by the end wall closes the chamber to the needle, and (3) further retraction of which side vent portion of the needle can bring the said vent into alignment with the forward outlet vent within the tubular member to open both ends of the needle to the exterior, a mating reciprocable plunger mounted within the tubular member blocking the opposite end of the chamber for covering and uncovering the chamber outlet vent to close and open the chamber to the exterior.

2. The apparatus of claim 1 further defined wherein the reciprocable plunger is provided with a forward recessed portion communicating with the chamber, and the wall of the recessed portion of the plunger is vented for alignment with the chamber outlet vent for opening and closing the chamber to the exterior.

3. The apparatus of claim 1 further defined wherein the reciprocable plunger is solid for blocking and unblocking the chamber outlet vent to open and close the chamber to the exterior.

4. In an apparatus for injection of small, accurately measured quantities of fluid into a system the combination comprising a main tubular body capped at a forward end by a needle assembly and at the other end by a plunger-plunger adjustment assembly, said tubular body consisting essentially of an outer tubular shell and an inner concentric tubular body defining a chamber, said chamber being externally vented through a lateral opening in the wall defining said chamber, said needle assembly adjoining the forward portion of the main tubular body, including a hub providing a forward, generally central opening and a relatively larger, internally threaded adjoining rear opening in axial alignment one opening with the other and with the chamber of the main tubular body, a tubular needle slidably mounted within the hub openings, the needle being side vented at the terminal end for extension of that portion thereof into the chamber located in the main tubular body, and rigidly affixed upon the needle and located within the larger opening of the hub a threaded stop member which limits the forward movement of the needle upon movement out of the chamber of the main tubular body, a plunger-plunger adjustment assembly adjoined to the rear portion of the main tubular body, said plunger-plunger adjustment body being of tubular form and containing a central opening axially aligned and in communication with the chamber of said main tubular body, a reciprocable plunger mounted within said opening and at least the forward portion thereof mating with the opening of the main tubular body for opening and closing the vent thereof and for projection into the central chamber.

5. In an apparatus for injection of small, accurately measured quantities of fluid into a system the combination comprising
   a chamber defined by a housing having enclosing walls,
   an outlet vent located within the housing and opening into the chamber,
   a plunger located within the chamber, and movable therein to an extent sufficient to physically block to open and close the outlet vent to initiate and to close off flow of fluid from the chamber,
   a hollow needle slidably mounted within the housing, said needle being provided with a side vent opening for communicating with said chamber upon projection of the vented portion of the needle into the chamber and for closure of the needle to the chamber upon withdrawal of the vent opening from the chamber.

6. In an apparatus for injection of small, accurately measured quantities of fluid into a system the combination comprising
   a generally elongated chamber defined by the enclosing walls of a tubular member,
   an outlet vent located within the enclosing walls and toward the rear of the chamber,
   a solid plunger located within and blocking the rear end of the chamber and movable therein to an extent sufficient to open and close the outlet vent to initiate and to close off flow of fluid from the chamber,
a tubular needle slidably mounted within an enclosing forward wall, said needle being side vented at the portion thereof which can be projected through the forward wall into the chamber so that the chamber can be communicated with the exterior when the side vent portion of the needle is projected therein and closed to the exterior when the side vent portion of the needle is withdrawn.

7. In an apparatus for injection of small, accurately measured quantities of fluid into a system the combination comprising
a chamber defined by space within the enclosing walls of a side-vented main tubular body,
said tubular body being provided with a needle assembly on its forward end for communicating and dispensing fluid to and from the chamber,
and a plunger-plunger adjustment assembly on its opposite end to aid in the accomplishment of said objective,
said needle assembly including a hub rigidly adjoined to the forward tubular member, a central opening therethrough within which is slidably mounted a tubular needle,
said needle being side vented near its rear end for extension of the vented portion thereof into the chamber defined within the tubular body,
said plunger-plunger adjustment assembly including a body of tubular form affixed upon and extending the tubular body,
a mating plunger mounted therein for extension into and out of the main tubular body for opening and closing the vent thereof.

8. In an apparatus for injection of small, accurately measured quantities of fluid into a system the combination comprising
a main tubular body capped at a forward end by a needle assembly and at the other end by a plunger-plunger adjustment assembly, said main tubular body consisting essentially of an outer tubular shell and an inner concentric tubular body within which is defined a chamber,
said chamber being externally vented through a pair of lateral openings, a forward opening and a rear opening, in the walls defining said chamber,
said needle assembly constituting the forward portion of the main tubular body, including a tapered hub threadably engaged to the forward portion of the outer tubular shell,
said hub providing a forward, generally central opening and a relatively larger, internally threaded adjoining rear opening in axial alignment one opening with the other and with the chamber of the main tubular body,
a tubular needle slidably mounted within the hub openings, the needle being side vented at the terminal end for extension of that portion thereof into the chamber located within the main tubular body, a threaded stop member rigidly affixed upon the needle and located within the larger opening of the hub to limit the forward movement of the needle upon movement out of the chamber of the main tubular body and on contact of the external threads with the internally threaded rear opening of the hub, and again upon engagement between the pairs of threads,
a plunger-plunger adjustment assembly adjoined to the rear portion of the main tubular body, said plunger-plunger adjustment body including a body of tubular form containing a central opening axially aligned and in communication with the chamber of said main tubular body,
a reciprocable solid plunger mounted within said opening and at least the forward portion thereof mating with the opening of the main tubular body for opening and closing the rear vent thereof and for further projection into the central chamber, whereby
  (a) movement of the needle to its extreme forward position by threadable engagement of the externally threaded needle stop member with the internally threaded hub opening will open the needle to the exterior via the vented forward opening of the main tubular body,
  (b) movement of the needle by disengagement of the threads of the stop member and internally threaded hub opening will produce an intermediate positioning of the needle and will close the needle to the chamber and to the vented forward opening of the main tubular body, and
  (c) movement of the needle to its rearward position will vent the needle into the central chamber of the main tubular body, and, on the other hand,
  (d) the plunger of the plunger-plunger adjustment assembly can be moved forward to just close the rear vent opening,
  (e) can be projected further forward and into the chamber, and
  (f) can be retracted to open the vented rear opening of the main tubular body.

References Cited by the Examiner
UNITED STATES PATENTS 2,290,363 7/1942 Stirton _____ 222—321 X
3,203,455 8/1965 Horabin _____ 222—259 X ROBERT B. REEVES, *Primary Examiner.*

HADD S. LANE, *Examiner.*